(12) United States Patent  
Kitamura

(10) Patent No.: US 7,286,332 B2  
(45) Date of Patent: Oct. 23, 2007

(54) APPARATUS FOR PROTECTING BICYCLE ELECTRICAL COMPONENTS

(75) Inventor: Satoshi Kitamura, Kitakatsuragi-gun (JP)

(73) Assignee: Shimano, Inc., Sakai, Osaka (JP)

( * ) Notice: Subject to any disclaimer, the term of this patent is extended or adjusted under 35 U.S.C. 154(b) by 0 days.

(21) Appl. No.: 10/907,875

(22) Filed: Apr. 19, 2005

(65) Prior Publication Data

US 2005/0275978 A1    Dec. 15, 2005

(30) Foreign Application Priority Data

Jun. 11, 2004   (JP)   ............................. 2004-174402

(51) Int. Cl.  
*H02H 3/00*   (2006.01)
(52) U.S. Cl. ...................... 361/79; 361/93.7; 361/93.9; 290/1 A; 322/25; 322/28
(58) Field of Classification Search ............ 361/20–21, 361/54, 56–67, 79, 88–91.1, 93.1–102; 315/77–78; 322/1, 29, 25; 362/473; 290/1 A
See application file for complete search history.

(56) References Cited

U.S. PATENT DOCUMENTS

| | | | | |
|---|---|---|---|---|
| 3,579,036 | A | * | 5/1971 | McCoy ......................... 361/57 |
| 4,658,200 | A | * | 4/1987 | Kouge ......................... 322/25 |
| 4,849,683 | A | | 7/1989 | Flolid |
| 5,089,766 | A | * | 2/1992 | Iwatani ........................ 322/25 |
| 5,243,487 | A | * | 9/1993 | Klett ............................ 361/56 |
| 5,247,430 | A | * | 9/1993 | Schwaller .................... 362/473 |
| 5,254,935 | A | * | 10/1993 | Vercesi et al. ................ 322/29 |
| 5,455,485 | A | | 10/1995 | Kutter |
| 5,828,177 | A | * | 10/1998 | Toda et al. .................. 315/127 |
| 6,690,127 | B2 | * | 2/2004 | Birkestrand et al. ........ 318/139 |
| 6,768,273 | B2 | * | 7/2004 | Uno ........................... 315/291 |
| 6,788,030 | B2 | * | 9/2004 | Kitamura ...................... 322/28 |
| 7,245,171 | B2 | * | 7/2007 | Uno ........................... 327/313 |

FOREIGN PATENT DOCUMENTS

| | | |
|---|---|---|
| DE | 3832109 A1 | 3/1990 |
| DE | 4121855 A1 | 1/1993 |
| DE | 4222994 A1 | 1/1994 |
| GB | 2126438 A | 3/1984 |
| JP | 2652734 B2 | 4/1993 |
| JP | 3378268 B2 | 11/1993 |
| JP | 07-329852 A | 12/1995 |
| JP | 2001-035673 A | 2/2001 |
| JP | 2004-088812 A | 3/2004 |

* cited by examiner

*Primary Examiner*—Michael Sherry  
*Assistant Examiner*—Terrence R. Willoughby  
(74) *Attorney, Agent, or Firm*—James A. Deland

(57) ABSTRACT

An electrical control apparatus comprises a current sensor and a current inhibiting circuit that inhibits current flow between first and second terminals of a bicycle dynamo when current sensed by the current sensor is below a selected value.

14 Claims, 2 Drawing Sheets

Fig. 1
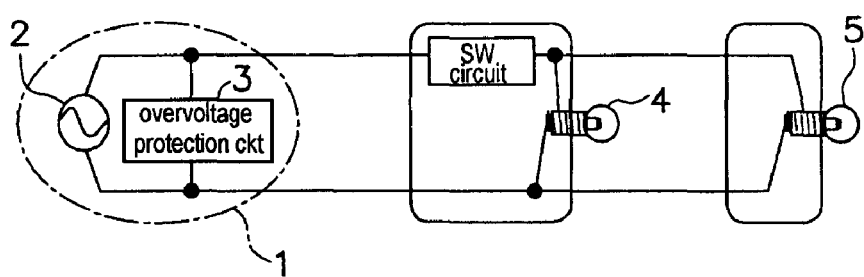
Prior Art
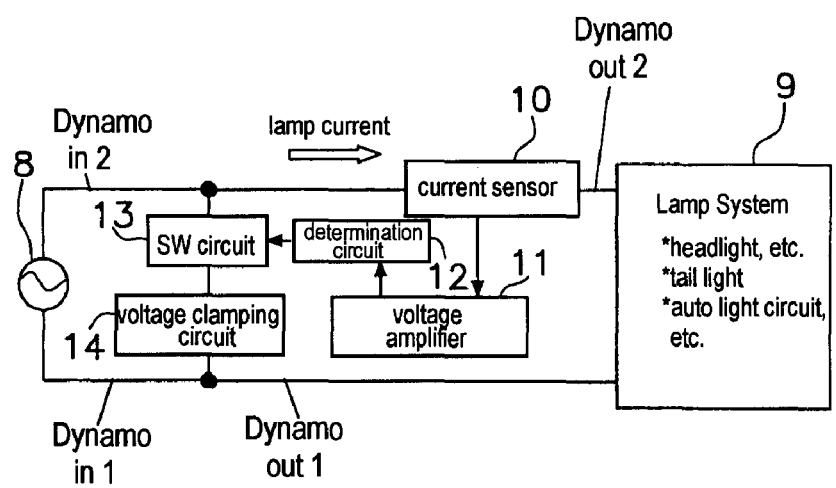
Fig. 2

APPARATUS FOR PROTECTING BICYCLE ELECTRICAL COMPONENTS

BACKGROUND OF THE INVENTION

The present invention is directed to bicycles and, more particularly, to an apparatus for protecting electrical components associated with the bicycle.

Many electrical devices are available for use with bicycles. For example, lighting systems comprising a headlight, a taillight and other lighting elements often are used for night riding. Such lighting systems and other electrical equipment usually receive operating power from a battery or a dynamo. When a dynamo is used for the power supply, the voltage generated by the dynamo usually is proportional to the bicycle speed (wheel RPM). At high speeds, the generated voltage can sometimes exceed 100 V, so some kind of protection device is needed to prevent excessive voltage from being applied to the electrical components. Japanese Unexamined Patent Application (Kokai) No. 2204-88812 discloses a voltage protection device in the form of a bypass circuit comprising a Zener diode disposed between the dynamo and the load. When the voltage generated by the dynamo is over a certain threshold, current flows through the Zener diode so that the voltage applied to lamps and to other electrical equipment is limited to no more than a selected voltage level.

While the use of a bypass circuit such as a Zener diode can provide overvoltage protection for the electrical components, bypass circuits can produce some undesirable side effects. For example, the electrical current consumed by the electrical devices creates rotational resistance in the dynamo, and such rotational resistance adds to the pedaling effort required by the cyclist. Some dynamos, such as block dynamos, are activated only when needed to power the electrical equipment. Accordingly, those dynamos do not create pedaling resistance when the electrical equipment is not in use.

On the other hand, internal hub dynamos are built integrally with the wheel hub and always rotate together with the wheel. FIG. 1 is a schematic block diagram of a bicycle electrical component system that employs an internal hub dynamo and an overvoltage protection circuit. As shown therein, an overvoltage protection circuit 3 comprising a Zener diode is connected to the dynamo 2 of a wheel hub dynamo unit 1. Electrical components powered by such dynamos are turned on manually or automatically independently of rotation of the wheel. Electrical power is consumed by headlight 4 and taillight 5 whenever they are turned on, thus causing rotational resistance in rotation of the wheel hub. When headlight 4 and taillight 5 are turned off, overvoltage protection circuit 3 consumes all of the power that was consumed by headlight 4 and taillight 5 when those lighting elements were turned on. Thus, dynamo 2 always generates power and creates rotational resistance, thus resulting in unnecessary pedaling burden on the rider.

SUMMARY OF THE INVENTION

The present invention is directed to various features of a device for protecting bicycle electrical components. In one embodiment, an electrical control apparatus comprises a current sensor and a current inhibiting circuit that inhibits current flow between first and second terminals of a bicycle dynamo when current sensed by the current sensor is below a selected value. Additional inventive features will become apparent from the description below, and such features alone or in combination with the above features may form the basis of further inventions as recited in the claims and their equivalents.

BRIEF DESCRIPTION OF THE DRAWINGS

FIG. 1 is a schematic block diagram of a bicycle electrical control apparatus that employs an internal hub dynamo and an overvoltage protection circuit;

FIG. 2 is a schematic block diagram of an embodiment of a bicycle electrical control apparatus with an inventive protective device.

DETAILED DESCRIPTION OF THE EMBODIMENTS

Figure 3:
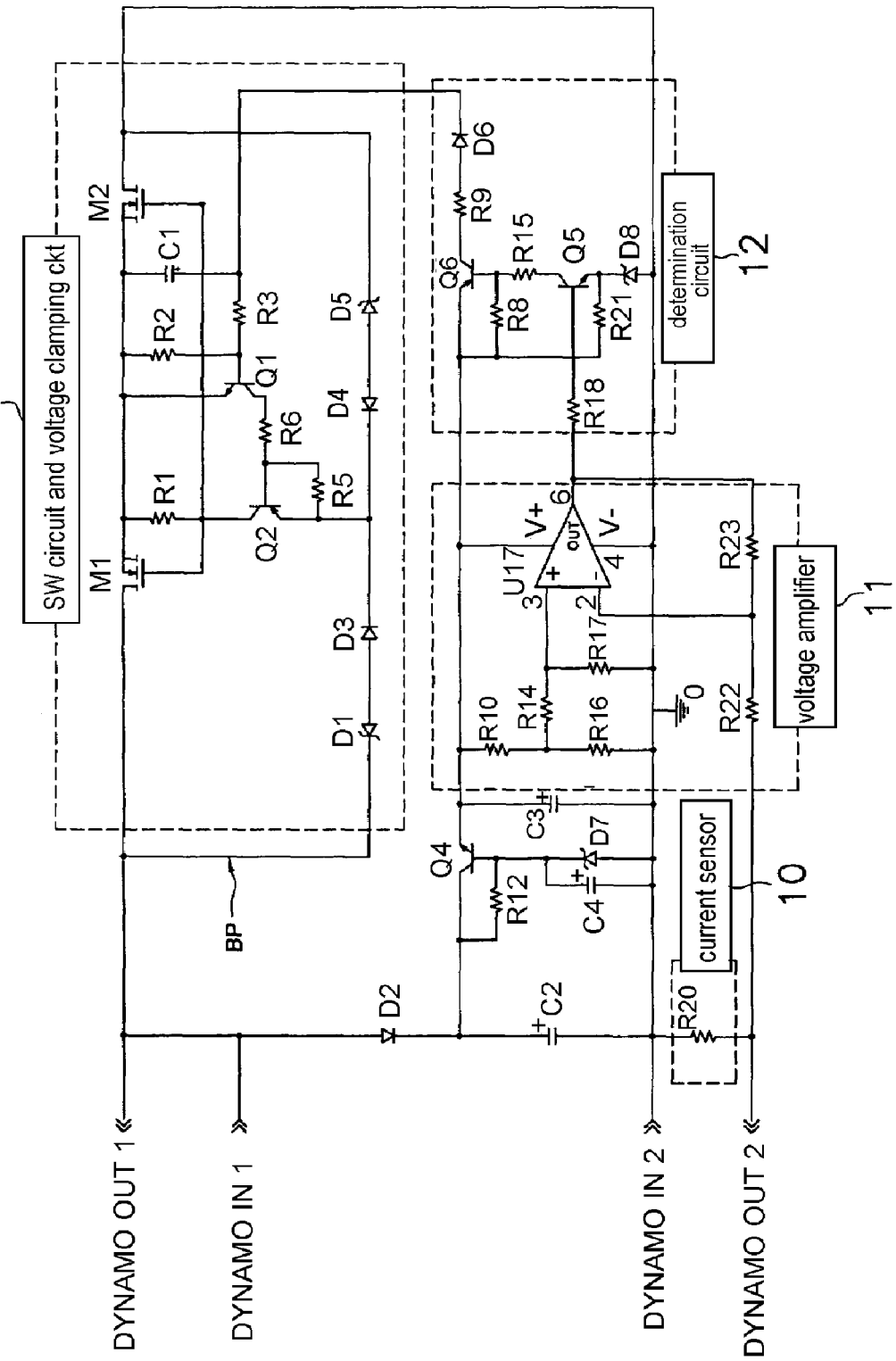
FIG. 3 is a more detailed schematic diagram of relevant components of the bicycle electrical control apparatus shown in FIG. 2.

FIG. 2 is a schematic block diagram of an embodiment of a bicycle electrical control apparatus with an inventive protective device. In this embodiment, an internal wheel hub dynamo 8 provides operating power to a lamp system 9. Lamp system 9 may comprise a headlight, a taillight, other lighting elements, an auto light circuit for turning selected lighting elements on and off in response to ambient light, and other electronic components. Further circuit elements are provided to provide overvoltage protection and for controlling rotational resistance of dynamo 8 when lamp system 9 is turned off.

More specifically, a current sensor 10 detects current flow through lamp system 9, a voltage amplifying circuit 11 amplifies a voltage produced by current sensor 10, a determination circuit 12 determines whether or not current detected by current sensor 10 is below a selected value, a voltage clamping circuit 14 provides overvoltage protection for lamp system 9, and a current inhibiting circuit in the form of a switching circuit 13 inhibits current flow through voltage clamping circuit 14 in response to signals from determination circuit 12. In general, current flows through lamp system 9 when the auto light circuit within lamp system 9 turns on the various lighting elements. Little or no current flows through lamp system 9 when the auto light circuit within lamp system 9 turns off the lighting elements or when the lighting elements within lamp system 9 are nonfunctional, such as when the lighting elements are broken. When current sensor 10 senses current flow through lamp system 9, and when determination circuit 12 determines that current sensed by current sensor 10 is above a selected value, then determination circuit 12 switches on switching circuit 13, and current flows through voltage clamping circuit 14 when required to prevent excessive voltage from being applied to lamp system 9. When determination circuit 12 determines that current sensed by current sensor 10 is below the selected value, then determination circuit 12 switches off switching circuit 13. When that happens, no current flows through voltage clamping circuit 14 between the two output terminals of dynamo 8, and rotational resistance in dynamo 8 caused by current consumption is eliminated.

FIG. 3 is a schematic diagram of a specific embodiment of the circuit represented in FIG. 2. In this embodiment, a diode D2 and a capacitor C2 are connected in series between a Dynamo In 1 terminal (an output terminal from dynamo 8) and a Dynamo In 2 terminal (another output terminal from dynamo 8). A positive terminal of capacitor C2 is connected to a cathode terminal of diode D2 and to a node between a collector terminal of a transistor Q4 and a terminal of a resistor R12. The other terminal of resistor R12 is connected to a node between a base terminal of transistor Q4, a positive terminal of a capacitor C4, and a cathode terminal of a Zener diode D7. The other terminals of capacitor C4 and Zener diode D7 are connected to the Dynamo In 2 terminal. A positive terminal of a capacitor C3 is connected to an emitter terminal of transistor Q4, and the other terminal of capacitor C3 is connected to the dynamo In 2 terminal. Transistor Q4 and Zener diode D7 stabilize the voltage of capacitor C2 to (D7 Zener voltage)—(Q4 base-emitter voltage drop). This stabilized voltage is used as the power source for the remaining circuit components.

Current sensor 10 comprises a resistor R20 that is connected between the Dynamo In 2 terminal and a Dynamo Out 2 terminal connected to lamp system 9. Thus, a voltage drop occurs across resistor R20 when current flows from the Dynamo In 2 terminal through lamp system 9, whereas a voltage drop does not occur across resistor R20 when the lighting elements within lamp system 9 are turned off (or are nonfunctional) and no current flows through lamp system 9. The voltage drop across resistor R20 is amplified by voltage amplifier 11, and this amplified voltage drop is used by determination circuit 12 to determine whether or not to turn on switching circuit 13.

Voltage amplifier 11 comprises an operational amplifier (op amp) U17; resistors R10, R14, R16, and R17 connected as shown to a non-inverting input terminal of op amp U17; and resistors R22 and R23 connected as shown to an inverting input terminal of op amp U17. Determination circuit 12 basically comprises an npn transistor Q5 having a base terminal connected to an output terminal of op amp U17 through a resistor R18, and a pnp transistor Q6 having a base terminal connected to a collector terminal or transistor Q5 through a resistor R15. Resistors R8 and R21 receive a positive power supply signal and are respectively connected to the base terminal of transistor Q6 and to an emitter terminal of transistor Q5. A Zener diode D8 is connected between the emitter terminal of transistor Q5 and the Dynamo In 2 terminal. A resistor R9 and diode D6 are serially connected to a collector terminal of transistor Q6, wherein the cathode terminal of diode D6 provides signals to combined switching circuit 13 and voltage clamping circuit 14.

A combined switching circuit 13 and voltage clamping circuit 14 are disposed between the Dynamo In 1 terminal and the Dynamo In 2 terminal, wherein the Dynamo In 1 terminal is common with a Dynamo Out 1 terminal connected to lamp system 9. Switching circuit 13 and clamping circuit 14 together generally comprise an npn transistor Q1 having a base terminal connected to the cathode terminal of diode D6 in determination circuit 12 through a resistor R3, a pnp transistor Q2 having a base terminal connected to a collector terminal of transistor Q1 through a resistor R6, and two serially connected field-effect (FET) (e.g., PMOS) transistors M1 and M2 connected between the Dynamo In 1 terminal and the Dynamo In 2 terminal. Gate terminals of transistors M1 and M2 are connected to a node between a resistor R1 and a collector terminal of transistor Q2, wherein the other terminal of resistor R1 is connected to a node between the source/drain terminals of transistors M1 and M2. A resistor R2 is connected to the base terminal of transistor Q1 and to a node between the source/drain terminals of transistors M1 and M2, and a capacitor C1 is connected to a node between resistor R3 and the cathode terminal of diode D6 in determination circuit 12 and to a node between the source/drain terminals of transistors M1 and M2. The emitter of transistor Q1 also is connected to a node between the source/drain terminals of transistors M1 and M2, whereas the emitter of transistor Q2 is connected to a node between cathode terminals of diodes D3 and D4. A resistor R5 is connected between the base and emitter terminals of transistor Q2. Anode terminals of diodes D3 and D4 are connected to respective anode terminals of Zener diodes D1 and D5, wherein the cathode terminal of Zener diode D1 is connected to the Dynamo In 1 terminal, and the cathode terminal of diode D5 is connected to the Dynamo IN 2 terminal. Diodes D1, D3, D4 and D5 form part of a bypass circuit BP that includes switching circuit 13 and voltage clamping circuit 14 and functions in a manner discussed below.

The system operates in the following manner when lamp system 9 is turned on. During positive half-cycles of dynamo 8 at the Dynamo In 1 terminal when the bicycle is traveling at low speed, capacitor C2 charges and smoothes the voltage via the half-wave rectification performed by diode D2. At the same time, current flows from the Dynamo In 1 terminal through the Dynamo Out 1 terminal and to lamp system 9. Capacitor C2 provides voltage and current to the collector of transistor Q4, and the stabilized voltage is supplied to op amp U17, etc., as the power source of the circuit elements. Since the lighting elements in lamp system 9 are on, current flows through resistor R20, and positive voltage is produced at the Dynamo Out 2 terminal of resistor R20 relative to the Dynamo In 2 terminal of resistor R20, assuming a standard ground. However, because of the inverting amplification of op amp U17, the output voltage of op amp U17 tends to be low, and transistors Q5 and Q6 in determination circuit remain off. As a result, transistors Q1 and Q2 in switching circuit 13 and voltage clamping circuit 14 remain off, the gate voltage at transistors M1 and M2 is zero volts, and no voltage clamping occurs.

During positive half-cycles of dynamo 8 at the Dynamo In 1 terminal when the bicycle is traveling at high speed, the circuit operates in the same manner. Voltage clamping still will not occur regardless of whether or not the Zener diodes D1 and D5 break down, since transistors Q1 and Q2 are off and the gate voltage at transistors M1 and M2 is 0 V.

During positive half cycles of dynamo 8 at the Dynamo In 2 terminal when the bicycle is traveling at low speed, current input from the Dynamo In 2 terminal passes through resistor R20 and is supplied by the Dynamo Out 2 terminal to lamp system 9. A negative voltage drop is produced at the Dynamo Out 2 terminal of resistor R20 relative to the Dynamo In 2 terminal of resistor R20, assuming a standard ground, and this voltage drop is amplified by op amp U17. When the voltage level at the output terminal of op amp U17 is greater than (D8 Zener voltage)+(Q5 base-emitter voltage drop), transistor Q5 turns on, thus turning on transistor Q6. At this time, the current flows as follows: Q6 emitter→Q6 collector→R9→D6→C1→M1 source→M1 drain→Dynamo Out 1 terminal. The charged capacitor C1 turns on transistors Q1 and Q2. However, at low speeds, the voltage is not sufficient to cause diodes D1 and D5 to break down, so no voltage clamping occurs at this time.

During positive half-cycles of dynamo 8 at the Dynamo In 2 terminal when the bicycle is traveling at high speed, transistors Q1 and Q2 are turned on in the same manner as noted above. When the voltage exceeds the Zener voltage of Zener diode D5, Zener diode D5 breaks down, current passes through transistor Q2, and the gate voltage of transistors M1 and M2 increases. When the drain-source potential difference of transistor M2 is greater than (D5 Zener voltage+D4 forward drop voltage+M2 gate ON voltage), then an increase in the source gate voltage of transistor M2 results in a drop in the drain-source resistance of transistor M2 with a concomitant attenuation in the drain-source potential difference of transistor M2. On the other hand, when the drain-source potential difference of transistor M2 is less than (D5 Zener voltage+D4 forward drop voltage+M2 gate ON voltage), then a decrease in the source gate voltage of transistor M2 results in an increase in the drain-source resistance of transistor M2 with a concomitant increase in the drain-source potential difference of transistor M2. As a result, equilibrium is reached, with the drain-source potential difference of transistor M2 equal to (D5 Zener voltage+ D4 forward drop voltage+M2 gate ON voltage). The difference in potential between the Dynamo IN 1 terminal and Dynamo IN 2 terminal is thus clipped to no more than (D5 Zener voltage+D4 forward drop voltage+M2 gate ON voltage+M1 parasitic diode drop voltage).

Once capacitor C1 is charged as noted above, transistors Q1 and Q2 are turned on. Thus, during the next half cycle with a positive Dynamo In 1 terminal, transistor Q1 remains on because of the charged capacitor C1, despite the positive voltage at the Dynamo In 1 terminal. This time, the difference in potential between the Dynamo In 1 terminal and the Dynamo In 2 terminal is clamped no more than (D1 Zener voltage+D3 forward drop voltage+M1 gate ON voltage+M2 parasitic diode drop voltage).

Because virtually all of the power is consumed by transistors M1 and M2 during the clamping operation, inexpensive and compact small-signal diodes can be used for Zener diodes D1 and D5 to determine the clamping voltage.

When the lighting elements in lamp system 9 are turned off, or when the lighting elements malfunction and draw no current, no current input from the Dynamo In 2 terminal passes through resistor R20 (which forms the voltage sensor). Accordingly, the voltage drop across resistor R20 is minute (theoretically zero), and transistors Q5 and Q6 (which form the determination circuit 12) are turned off. No current charges capacitor C1, and the potential of capacitor C1 drops. Eventually, transistors Q1 and Q2 turn off, the gate voltage at transistors M1 and M2 returns to zero, and the clamping operation ceases. With virtually no current flowing through switching and voltage clamping circuits 13 and 14, and hence between the Dynamo In 1 and Dynamo In 2 terminals, the rotational resistance of dynamo 8 caused by such current flow does not increase.

While the above is a description of various embodiments of inventive features, further modifications may be employed without departing from the spirit and scope of the present invention. For example, while a lighting system was used as an example of electrical equipment powered by dynamo 8, the teachings herein can be applied to many other types of electrical equipment. The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. An electrical control apparatus for controlling current supplied from first and second terminals of a bicycle dynamo to operate a bicycle electrical device other than the dynamo, wherein the apparatus comprises:
    a current sensor that senses current flowing to the bicycle electrical device that operates the bicycle electrical device; and
    a protective circuit that limits voltage communicated to the bicycle electrical device, bypasses current past the bicycle electrical device when current is sensed by the current sensor while continuing to allow current to flow to the bicycle electrical device to operate the bicycle electrical device, and substantially prevents current from bypassing when current sensed by the current sensor is below a selected value.

2. The apparatus according to claim 1 wherein the current sensor comprises a resistor such that current is sensed by a voltage drop across the resistor.

3. The apparatus according to claim 2 further comprising a voltage amplifier that amplifies the voltage drop across the resistor.

4. The apparatus according to claim 1 wherein the protective circuit inhibits current flow between the first and second terminals of the dynamo when current sensed by the current sensor is substantially zero.

5. The apparatus according to claim 1 wherein the protective circuit comprises a switching circuit.

6. The apparatus according to claim 5 wherein the switching circuit switches off current flow between the first and second terminals of the dynamo when current sensed by the current sensor is below the selected value.

7. The apparatus according to claim 6 wherein the protective circuit further comprises a voltage clamping circuit that clamps a voltage applied to the bicycle electrical device when the switching circuit is in a switched on state.

8. The apparatus according to claim 7 wherein the voltage clamping circuit comprises a Zener diode.

9. The apparatus according to claim 7 wherein the current sensor comprises a resistor such that current is sensed by a voltage drop across the resistor.

10. The apparatus according to claim 9 further comprising a voltage amplifier that amplifies the voltage drop across the resistor.

11. The apparatus according to claim 5 wherein the switching circuit comprises a transistor that switches off current flow between the first and second terminals of the dynamo when current sensed by the current sensor is below the selected value.

12. The apparatus according to claim 11 wherein the transistor comprises a field-effect transistor.

13. The apparatus according to claim 11 wherein the transistor is turned on and off by the current sensor.

14. An electrical control apparatus for controlling current supplied from first and second terminals of a bicycle dynamo to a bicycle electrical device, wherein the apparatus comprises:
    a current sensor that provides a current sensing signal; and
    a protective circuit that limits voltage communicated to the bicycle electrical device, bypasses current past the bicycle electrical device in response to the current sensing signal when current is sensed by the current sensor, and substantially prevents current from bypassing in response to the current sensing signal when current sensed by the current sensor is below a selected value and voltage from the bicycle dynamo is above a value sufficient to cause the protective circuit to ordinarily bypass current past the bicycle device.

* * * * *